(No Model.) 2 Sheets—Sheet 1.
G. C. HORST.
WATER ELEVATOR.
No. 545,200. Patented Aug. 27, 1895.
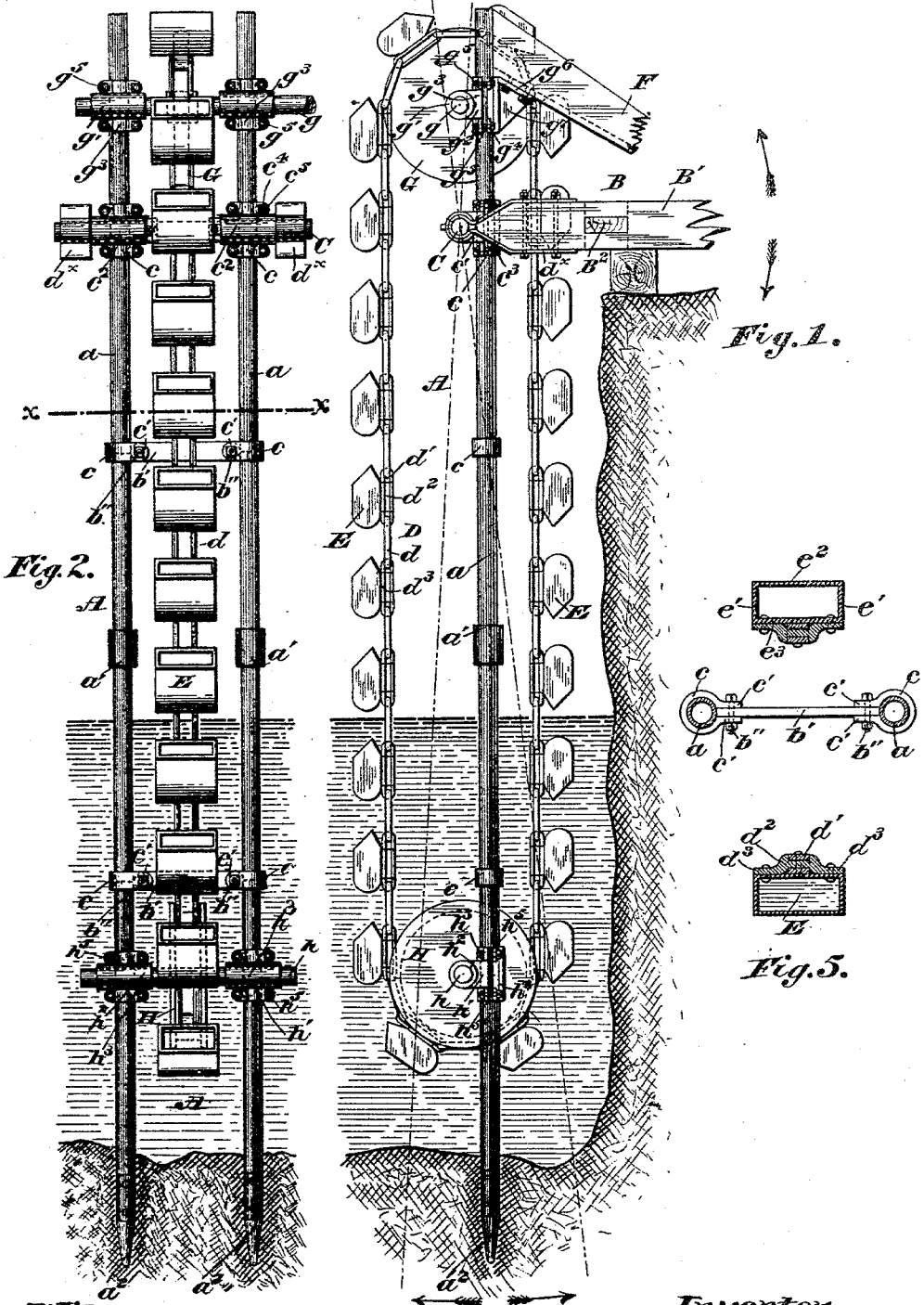
Witnesses:
Frank Blair Rives.
M. B. May
Inventor
George C. Horst
by H. H. Bliss
Attorney.

(No Model.) 2 Sheets—Sheet 2.

G. C. HORST.
WATER ELEVATOR.

No. 545,200. Patented Aug. 27, 1895.

Witnesses:
Frank Blair Rives
M. B. May

Inventor
George C. Horst
by H. H. Bliss
Attorney

UNITED STATES PATENT OFFICE.

GEORGE C. HORST, OF COLUMBUS, OHIO, ASSIGNOR TO JOSEPH A. JEFFREY, OF SAME PLACE.

WATER-ELEVATOR.

SPECIFICATION forming part of Letters Patent No. 545,200, dated August 27, 1895.

Application filed November 13, 1894. Serial No. 528,689. (No model.)

*To all whom it may concern:*

Be it known that I, GEORGE C. HORST, a citizen of the United States, residing at Columbus, in the county of Franklin and State of Ohio, have invented certain new and useful Improvements in Water-Elevators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in water-elevators of that class in which the mechanism is portable and is adapted for use at the banks of rivers for the purpose of elevating water to a flume or trough, from whence it is taken for irrigating.

The object of the invention is to provide a water-elevator suitable for use by farmers, and which shall be portable, of small weight, and simple in construction, with but few parts.

I have shown and will hereinafter describe one form in which my invention is embodied, though many modifications may be made by those skilled in the art without departing from the spirit and scope of my invention.

Figure 4:
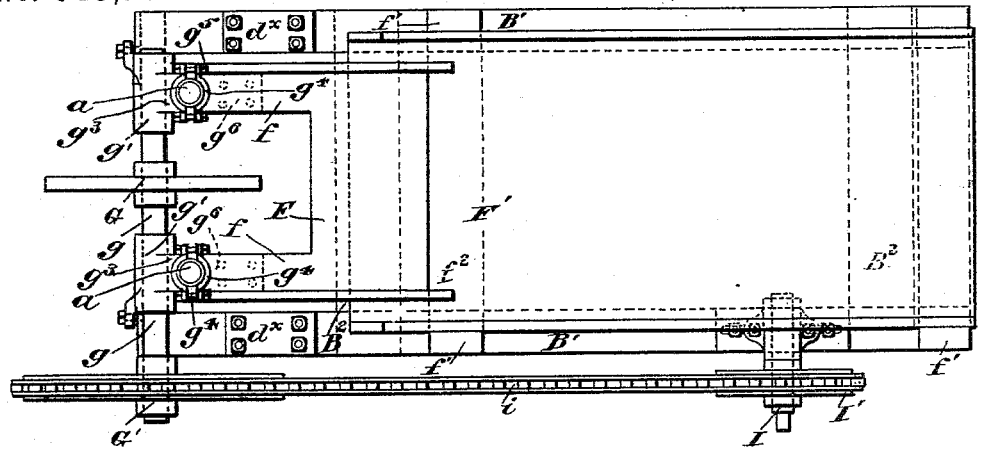
Figure 3:
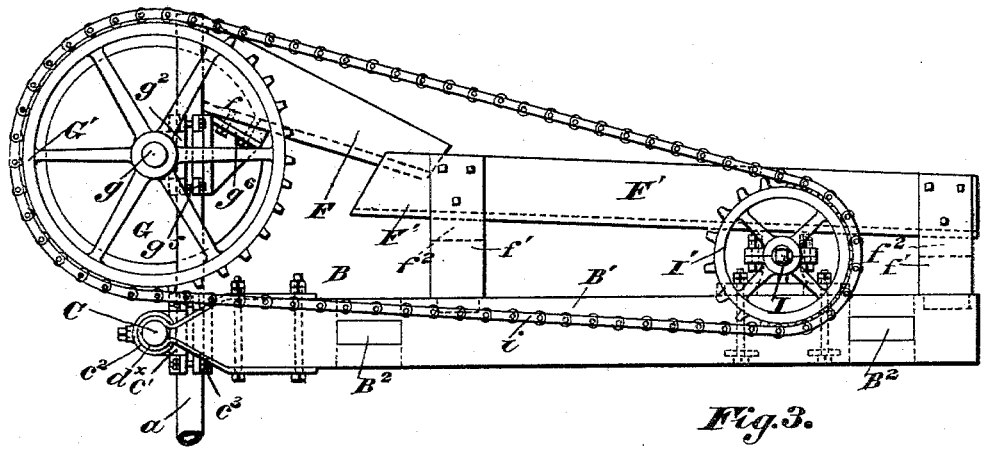
Figure 6:
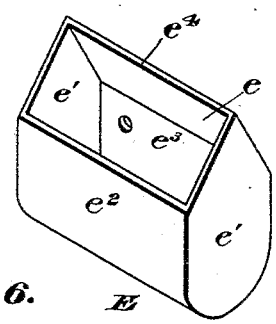

In the drawings, Figure 1 is a side elevation of the water-elevator. Fig. 2 is a front elevation. Fig. 3 shows in side view the head of the elevator somewhat enlarged. Fig. 4 shows a plan of the same. Fig. 5 is a cross-section on the line $x\ x$, Fig. 2. Fig. 6 shows in perspective one of the buckets.

The frame A consists of two parallel wrought-iron pipes $a\ a$, bound together and provided with adjustable boxes for supporting the shafting and chains. The frame is trunnioned to a support on the bank and extends downward to the water, as is shown in Fig. 1. It may assume an inclined position to the water parallel to the dotted lines shown in Fig. 1 as passing through the axis of the trunnion-shaft C.

The two side parts $a\ a$ of the frame are composed of sections of pipe connected by suitable couplings $a'\ a'$. At the ends they are provided with metallic pointed plugs $a^2\ a^2$, which are inserted and held in place by rivets which pass through them and the pipe. When the frame is in position, the plugs are driven down into the soil at the bottom of the stream, so as to hold the frame in position.

The side bars are connected and firmly braced by any suitable number of wrought-iron cross-bars $b'\ b'$, the ends of which are bolted between the split lugs $c'\ c'$ of cast-iron collars $c\ c$. The collars pass around the pipes $a\ a$, and the fastening-bolts $b''$ not only secure the brace-bars to the collars, but also clamp the collars firmly to the pipes.

The frame A is supported at its upper end by a framework B, having longitudinal sills or beams B' and cross-bars B². Clamp-boxes $c\ c$ are detachably secured around the pipes $a$, each having a section $c'$, with a journal $c^2$ for a trunnion-shaft C, mounted transversely of the frame A, and a clamp part $c^3$, said parts $c'$ and $c^3$ being clamped tightly around pipes $a\ a$ by means of bolts $c^4$ and nuts $c^5$. By loosening the bolts and nuts the journals and shaft C may be shifted to a different position on the frame A. The trunnion-shaft C projects a short distance beyond the sides of the frame and is mounted in straps $d$, which are bolted to the outwardly-projecting ends of the sills or timbers B' B'. Thus it will be seen that the side pipes $a$ of frame A can be lengthened to suit the locality in which it is to be used by simply adding one or more sections of pipe and that the frame as a whole can be readily adjusted relatively to the supporting-frame B and trunnion-shaft C.

The chains and buckets may be of any of the ordinary sorts now in use; but I prefer to use the style of chain and bucket which I will now describe.

The chain D consists of wrought-rod links $d$, connected by flat straps $d'$, having their ends welded or riveted together. Between the parallel sides of the strap is secured a block $d^2$, having outwardly-extending ears $d^3\ d^3$, to which the buckets E are attached. The buckets E are of a peculiar shape, having openings $e$, which are thrown somewhat away from the vertical lines of the chain. Each bucket is provided with two end portions $e'$ and a front face $e^2$ and a rear face $e^3$, which may be riveted to or formed integrally with the ends $e'$. The upper portion $e^4$ of the rear face is inclined so that its lip is practically in the central vertical longitudinal plane of the ends $e'$. Thus it will be seen that the water will not be wasted or discharged until the bucket reaches the point of delivery over the trough F, and it will further be seen that when the water is discharged it will be thrown to some distance beyond the mouth of the bucket onto the trough.

The wheels G and H, which support and drive the chain, are detachably mounted upon the upper and lower ends, respectively, of the pipes $a$ of the frame A. The wheel H is mounted on a shaft $h$, which is journaled in clamp-boxes $h'$, similar to that at $c$, each having a journal $h^2$ on the clamp-section $h^3$, the other section $h^4$ being secured to it by bolts $h^5 h^5$, which clamp them adjustably around the pipes $a$. The wheel G is mounted on a shaft $g$, mounted in clamp-boxes $g'$, said shaft $g$ being extended at one end, upon which is secured a driving-wheel $G'$. Each clamp-box has a section $g^2$, with a journal $g^3$, and a section $g^4$, said sections being clamped around the pipe $a$ by bolts $g^5$. Each section $g^4$ is cast with an inclined flange $g^6$ and a supporting-web $g^7$. To the flanges $g^6$ is bolted the delivery-trough F for the water. The clamp-boxes are adjustable on the pipes $a$, so as to tighten the chain. The trough F empties into the flume F' and has arms $ff$, which are secured, as aforesaid, to the flanges $g^6$ of the clamps $g'$. A portion of the flume is shown, it being supported upon uprights $f'$ and cross-braces $f^2$. A shaft I is mounted in journals on the beam B, it being driven by a crank or by any suitable motor. On said shaft I is a wheel I', connected by a chain $i$ to the wheel G' on the shaft $g$.

It is obvious that the whole apparatus can be quickly taken apart and packed for shipping. The parts of the frame A can be readily unbolted and removed, and the pipes $a$ can be unjointed and packed in small space.

The mechanism is light and easily handled. By reason of having the bars $a$ formed of hollow tubes I am able to make the frame light and at the same time durable and strong. The frame can be easily adapted for any locality or for any height, it being necessary only to add to or take away from the side bars one or more sections of pipe and change the chain by adding or taking away some of the links or buckets. If the bank slopes, the buckets are so provided with the inclined rear face that water can be elevated at any angle without wasting or discharging an appreciable quantity.

It will be seen that the entire apparatus, including the bed-frame or platform B, as well as the frame and endless carrier of the vertical leg, can be made as factory articles in certain standard sizes and shipped to any point ready to be immediately placed in position, adjusted relatively to each other, and permanently secured in position. The power-shaft I can be mounted adjustably on the bed-plate or platform to allow for the variations in the inclination of the vertical leg, or the power-transmitting device, as the chain $i$, can be adjustable in length. The carriers or overhanging parts of the beams of the bed should project far enough to allow for all ordinary adjustments.

The chute F is so arranged that it can deliver into the trough or flume F' in whatever position it may be placed. When the elevator-leg is at a relatively large angle to the vertical, the upper shaft and the trunnion shaft or bar can be moved on the tubular frame farther apart from each other to permit the chute F to assume the proper position.

What I claim is—

1. A portable elevator for water and similar material, having a horizontal base frame or support at or near the upper end, and a vertical leg formed of upright tubing, and an endless chain carrier supported at the top and at the bottom on vertically adjustable shafts held in movable bearings clamped to the said upright tubes, substantially as set forth.

2. In a portable elevator, a vertical leg formed of two parallel tubes, in combination with an endless chain carrier having buckets, a bottom sprocket wheel, a vertically adjustable shaft for said wheel, movable bearings for said shaft clamped to the said tubes, a top sprocket wheel, a vertically adjustable shaft, a delivery chute vertically adjustable with said shaft, and vertical adjustable devices for securing said leg to a stationary bed frame or support, substantially as set forth.

3. The combination with the vertical leg of the elevator, and the supporting frame connected to the upper part thereof of a vertically adjustable trunnion shaft joining the vertical leg and the supporting frame, whereby the vertical leg can be supported on the ground in any of several positions independent of the upper frame, substantially as set forth.

4. The combination of the vertical elevator leg having an endless carrier, the vertically adjustable head shaft, the vertically adjustable chute F, and the vertically adjustable trunnion shaft, substantially as set forth.

5. The combination with the vertical elevator frame and the base frame or support longitudinally adjustable on the vertical frame, of the endless carrier mounted on the elevator frame, and the trunnion support for said frame on an axis transverse to the planes of the carrier, substantially as set forth.

6. The combination with the base frame or support having the overhanging or projecting carriers, and the driving shaft mounted on said frame, of the vertical frame having the two vertical side supports, the trunnion shaft secured to said side supports and longitudinally adjustable thereon and mounted in the said carriers of the bed frame, and the endless carrier mounted on the vertical frame, substantially as set forth.

In testimony whereof I affix my signature in presence of two witnesses.

GEORGE C. HORST.

Witnesses:
R. GROS. HUTCHINS,
MARCUS B. MAY.